United States Patent
Roberts

(10) Patent No.: US 7,046,128 B2
(45) Date of Patent: May 16, 2006

(54) COLLISION DETECTION AND WARNING SYSTEM FOR AUTOMOBILES

(76) Inventor: Kristie L. Roberts, 344 E. 2300 Rd., Edgerton, KS (US) 66021

( * ) Notice: Subject to any disclaimer, the term of this patent is extended or adjusted under 35 U.S.C. 154(b) by 51 days.

(21) Appl. No.: 10/854,288

(22) Filed: May 26, 2004

(65) Prior Publication Data

US 2005/0275514 A1   Dec. 15, 2005

(51) Int. Cl.
*B60Q 1/00*   (2006.01)
(52) U.S. Cl. .................. 340/436; 340/435; 340/903; 340/425.5; 340/943; 340/463; 701/35; 701/301
(58) Field of Classification Search ............... 340/436, 340/435, 903, 904, 901, 902, 425.5, 943, 340/460, 438, 463; 701/1, 35, 45, 301, 29; 280/734, 735
See application file for complete search history.

(56) References Cited

U.S. PATENT DOCUMENTS

| | | | |
|---|---|---|---|
| 4,028,662 A | | 6/1977 | Young |
| 4,450,430 A | * | 5/1984 | Barishpolsky et al. ...... 340/904 |
| 5,235,316 A | | 8/1993 | Qualizza |
| 5,339,075 A | | 8/1994 | Abst et al. |
| 5,583,495 A | | 12/1996 | Ben Lulu |
| 5,598,164 A | * | 1/1997 | Reppas et al. ................. 342/70 |
| 5,767,793 A | * | 6/1998 | Agravante et al. ........... 340/903 |
| 5,979,586 A | * | 11/1999 | Farmer et al. ............... 180/274 |
| 6,115,651 A | * | 9/2000 | Cruz ............................. 701/1 |
| 6,281,786 B1 | * | 8/2001 | Adachi et al. ............... 340/435 |
| 6,606,027 B1 | | 8/2003 | Reeves et al. |
| 6,657,581 B1 | * | 12/2003 | Lippert et al. ................. 342/70 |
| 6,778,073 B1 | * | 8/2004 | Lutter et al. ................. 340/435 |

* cited by examiner

*Primary Examiner*—Jeffery Hofsass
*Assistant Examiner*—Daniel Previl
(74) *Attorney, Agent, or Firm*—Dale J. Ream

(57) ABSTRACT

A collision detection and warning system for an automobile having left and right audio speakers and left and right turn signals includes at least four sensors and a control module. The sensors may be mounted on exterior surfaces of the automobile, such as on sides of the front and back bumpers, and are connected to the control module and the automobile's electrical system. The sensors are mounted in mounting assemblies and can be angularly oriented. Each corresponding front and back pair of sensors may detect an obstacle in the driver's "blind spot" when oriented in an appropriate beam splitting arrangement. Upon obstacle detection and actuation of a respective turn signal, the control system sends an alarm tone to the automobile's audio speaker on the side of the car nearest the danger and/or activates a respective alarm light to indicate the direction of danger.

16 Claims, 7 Drawing Sheets

COLLISION DETECTION AND WARNING SYSTEM FOR AUTOMOBILES

BACKGROUND OF THE INVENTION

This invention relates generally to systems for detecting obstacles and avoiding collisions. In particular, the present invention relates to a collision detection and warning system for an automobile that uses audible alerts to warn a driver of obstacles in the driver's "blindspots" at the rear and sides of the vehicle.

It is often difficult to change lanes while driving because the driver's blindspots at the rear and sides of the vehicle cannot be seen with either the rearview or side mirrors effectively. The rear looking neck movements are difficult for much of today's population, including the elderly, and the movements distract all drivers from looking ahead. A device that would make changing lanes easier and less dangerous would be widely welcomed.

Collision detection systems have been proposed on high-end cars in today's market. While the technology to achieve collision avoidance, problems with cost and convenience have kept this innovation off most new vehicles and virtually all older vehicles.

Some current systems use either a single transmitter located on the vehicle, such as in U.S. Pat. No. 4,450,430, or a single transmitter located at each side of the vehicle, such as in U.S. Pat. No. 4,028,662 and U.S. Pat. No. 5,339,075, to em it sound, light, or electromagnetic radiation waves at a target area. Some systems, such as in U.S. Pat. No. 5,583,495, suggest either a single transmitter or a transmitter on each side of the vehicle. If an object is in the target area, that object will reflect the waves. These systems then detect the presence of the reflected waves to determine if an object is in the target area, and some of the systems can detect the object's speed relative to the driver's vehicle. A warning signal is transmitted to the driver when a danger is sensed. Nevertheless, many of these systems have had difficulties effectively limiting the target area to distances that pose a danger to the driver. Without effectively limiting the target area, systems detect that a danger is posed to the driver when no such danger exists; this can be referred to as a false alarm or a false positive.

Other current systems use scanning transmitters and receivers, such as in U.S. Pat. No. 6,657,581, to obtain more information about the location of objects in the target areas and determine whether an object poses a threat to the driver. These transmitters and receivers act like those mentioned above and poorly limit the target area. However, the multiple readings help to overcome this shortcoming and provide a way to better determine which objects may be dangerous to the driver. U.S. Pat. No. 5,767,793 uses particular configurations of antenna arrays while scanning in order to better limit the target area and eliminate false positives.

The systems in U.S. Pat. No. 6,281,786 and U.S. Pat. No. 6,606,027 use a plurality of sensors to create more target areas and obtain more information. This additional information helps compensate for the general inability to closely limit the target area.

Still other current systems utilize complex circuitry and computer processing to determine the distance of an object from the transmitter, such as in U.S. Pat. No. 5,235,316.

Therefore, it is desirable to have a collision detection and warning system for an automobile that can detect objects in the driver's blindspots or other target areas, is suitable for both new car manufacture and retrofitting existing vehicles, minimizes false alarms, effectively notifies the driver of impending danger, complies with regulations concerning transmitters, and is relatively inexpensive.

SUMMARY OF THE INVENTION

A collision detection and warning system according to the present invention is suitable for use with an automobile of a type having a multi-speaker audio system and conventional turn signal controls. The system preferably includes four sensor assemblies and a control unit electrically connected to the audio system. A left alarm light, a right alarm light, and a mode switch may also be included. Each sensor assembly includes a sensor, an outer mounting plate, an inner mounting plate, a circuit board, and appropriate wiring.

Each sensor connects to a circuit board that connects to the control module and the automobile's electrical system. The control module connects to the automobile's electrical system to detect the activation of the left and right turn signals, and an interface electrically connects the control module to the automobile's left and right audio speakers. A mode switch and left and right alarm lights are installed inside the automobile, and each connects to the control module. The four sensor assemblies attach to the sides of the front and rear bumpers, respectively. While the sensors are preferably simple proximity sensors, other sensors could also be used, such as radar, infrared, laser, and ultrasonic sensors, for example. High pass filters may be employed to eliminate signals from low frequency reflections, thus minimizing false positives from stationary objects.

In use, each sensor transmits "pings" of sound or EM radiation and receives waves that are reflected back. When a sensor receives a reflected signal, a signal is sent to the control module. The control module alternates between a left blindspot checking routine and a right blindspot checking routine, both of which employ beam splitting to minimize false warnings. When an object is detected in the blindspot and the respective automobile turn signal is activated, the control system sends an alarm tone to the automobile's audio speaker on the side of the car nearest the danger and/or activates the respective alarm light to indicate the direction of danger.

Therefore, a general object of this invention is to provide a collision detection and warning system for an automobile that can detect objects in the driver's blindspots or other target areas.

Another object of this invention is to provide a collision detection and warning system for an automobile, as aforesaid, that effectively notifies the driver of impending danger.

Still another object of this invention is to provide a collision detection and warning system for an automobile, as aforesaid, that minimizes false alarms.

Yet another object of this invention is to provide a collision detection and warning system for an automobile, as aforesaid, that is suitable for both new car manufacture and retrofitting existing vehicles.

A further object of this invention is to provide a collision detection and warning system for an automobile, as aforesaid, that complies with regulations concerning transmitters.

A still further object of this invention is to provide a collision detection and warning system for an automobile, as aforesaid, that is relatively inexpensive.

Other objects and advantages of this invention will become apparent from the following description taken in connection with the accompanying drawings, wherein is set forth by way of illustration and example, embodiments of this invention.

DESCRIPTION OF THE PREFERRED EMBODIMENT

Figure 4:
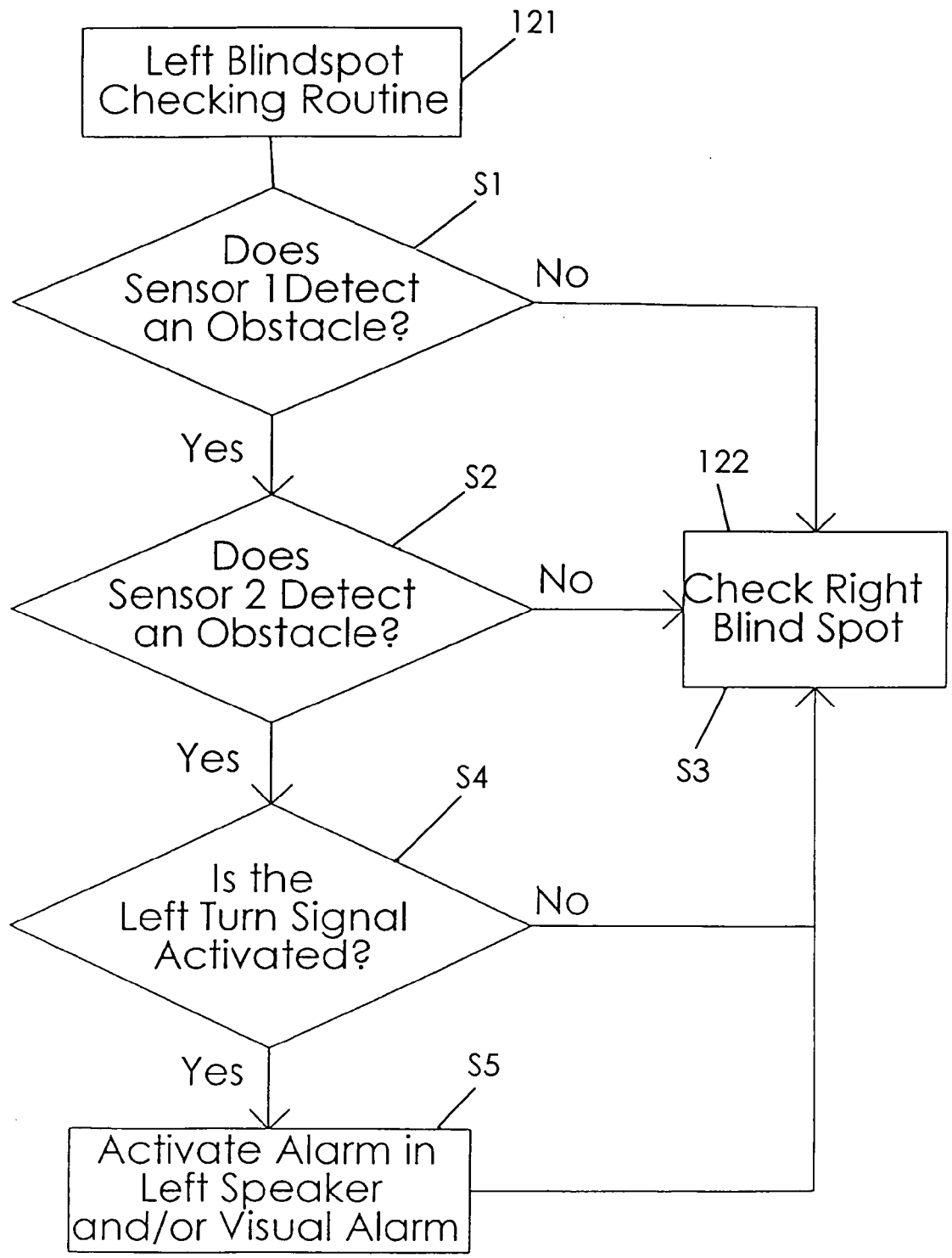
FIG. 4 is a flow chart showing the operation of the left blindspot checking routine.
Figure 5:
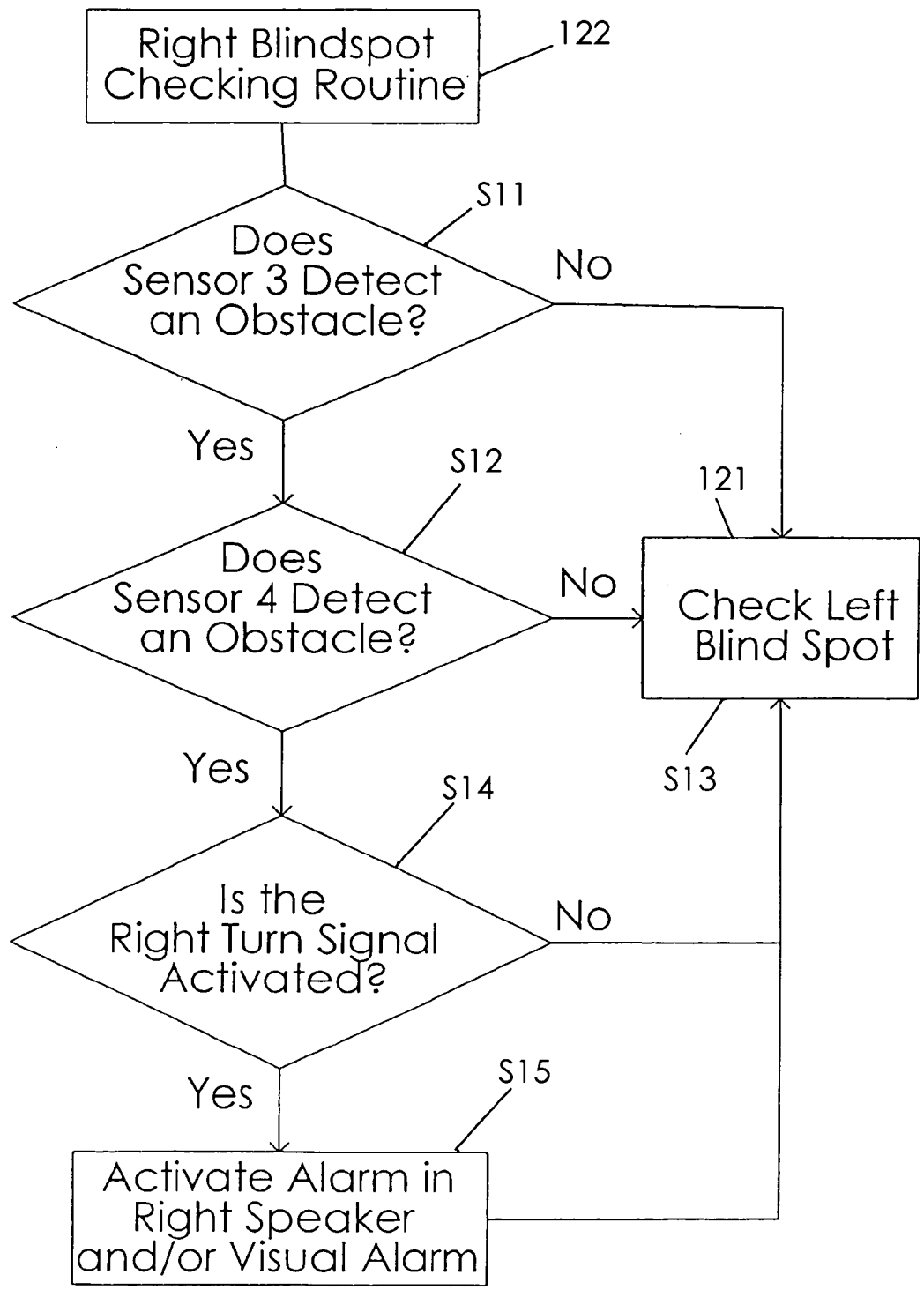
FIG. 5 is a flow chart showing the operation of the right blindspot checking routine.
Figure 6:
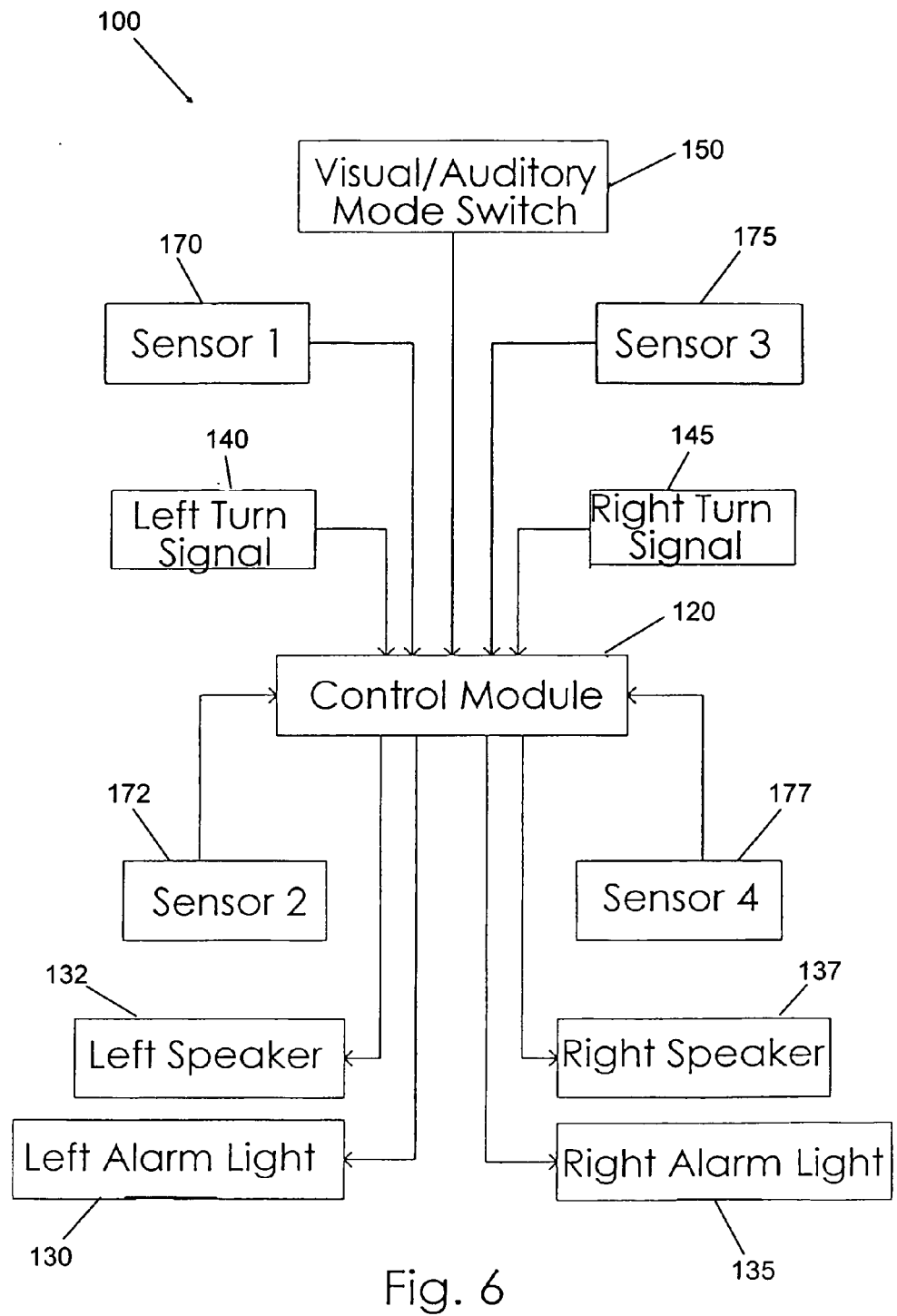
FIG. 6 is a block diagram showing the components of the collision detection and warning system.

A collision detection and warning system for an automobile according to the present invention will now be described in detail with reference to FIGS. 1 through 7 of the accompanying drawings. More particularly, a collision detection and warning system 100 according to a now preferred embodiment includes four sensor assemblies 110 and a control module 120. As to be described below in more details, the collision detection and warning system 100 may be electrically connected to a left car audio speaker 132, a right car audio speaker 137, a left automobile turn signal 140, and a right automobile turn signal 145. Accordingly, the system 100 may be retrofitted onto older existing automobiles. In addition, the system 100 may include a left alarm light 130, a right alarm light 135, and a mode switch 150 (FIG. 6).

Figure 2:
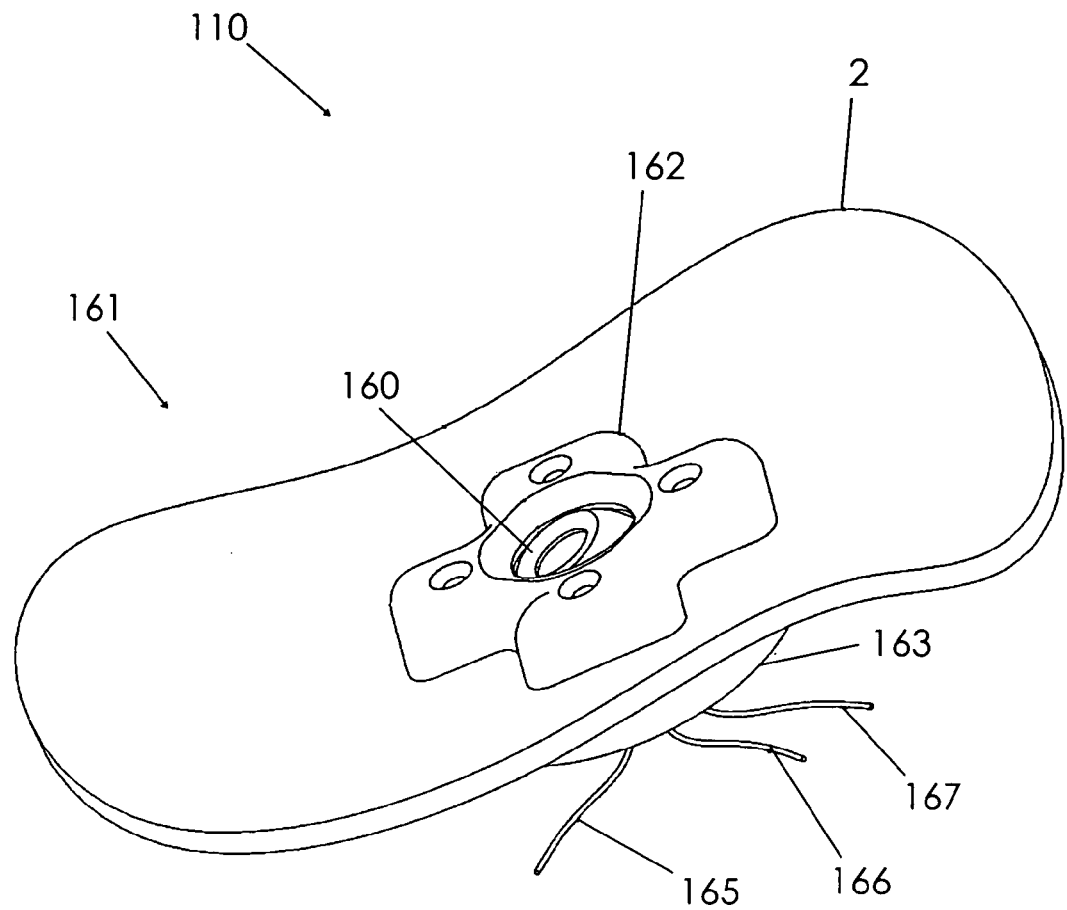
FIG. 2 is a front perspective view of a sensor assembly according to the collision detection and warning system mounted on a bumper.
Figure 3:
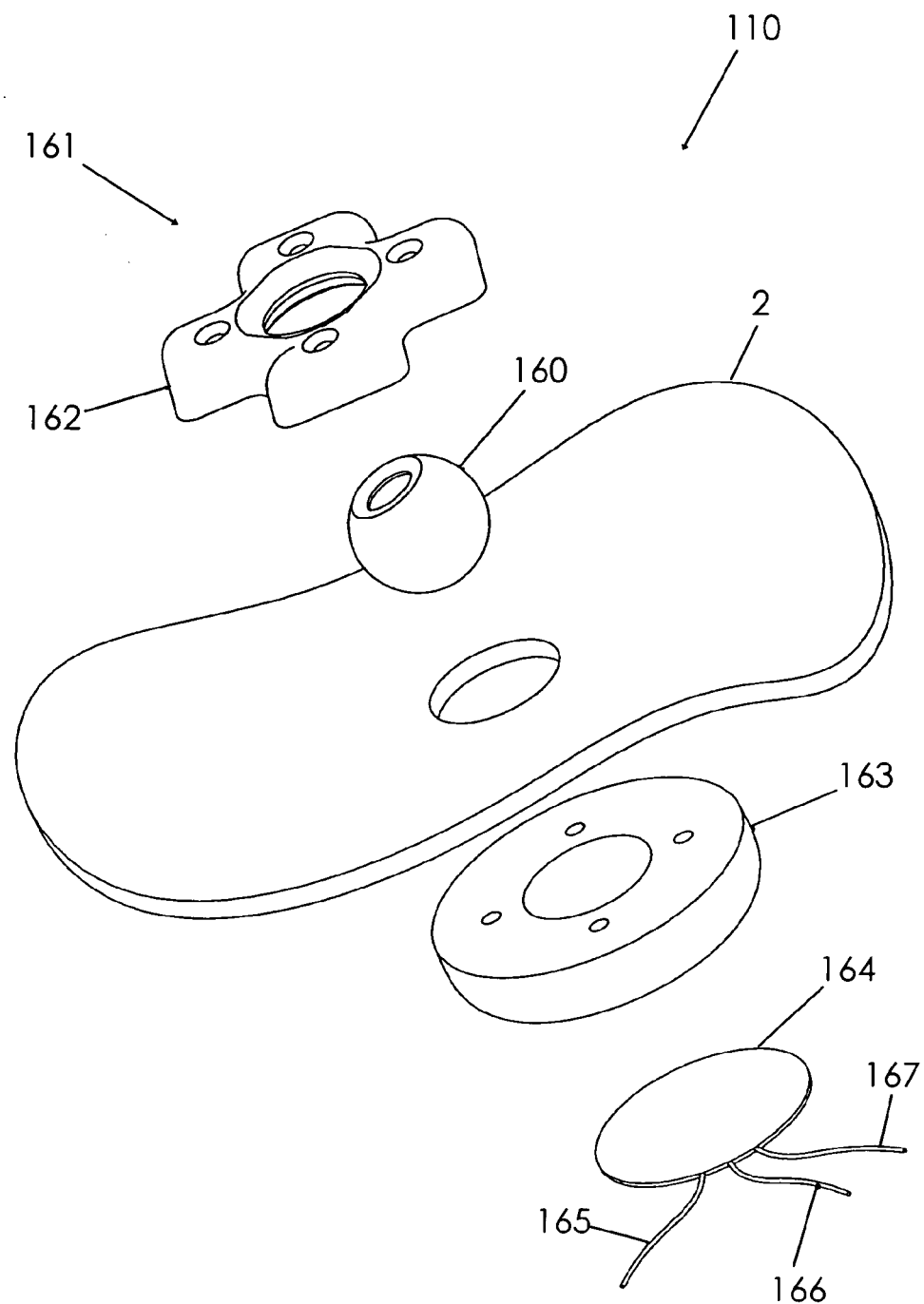
FIG. 3 is an exploded perspective view of the sensor assembly as in FIG. 2 and includes a bumper.

Each of the four sensor assemblies 110 includes a sensor 160 and a sensor mounting assembly 161. Each sensor mounting assembly 161 includes an outer mounting plate 162, an inner mounting plate 163 with a ball and socket configuration, a circuit board 164, a signal wire 165, a positive wire 166, and a negative wire 167. One sensor assembly 110 is shown in FIGS. 2 and 3. The sensor 160 fits in the inner mounting plate 163 and is connected to the circuit board 164. The inner mounting plate 163 is placed on an interior surface of an automobile, and the outer mounting plate 162 is placed on an exterior surface of the automobile and connected to the inner mounting plate 163, thus clamping the respective sensor assembly 110 to the automobile. The positive and negative wires 166, 167 connect the circuit board 164 to the automobile's electrical system or an alternate power source, and the signal wire 165 transmits information from the circuit board 164 to the control module 120. The sensor 160 in the first sensor assembly 110 can be referred to as the first sensor 170, the sensor 160 in the second sensor assembly 110 can be referred to as the second sensor 172, the sensor 160 in the third sensor assembly 110 can be referred to as the third sensor 175, and the sensor 160 in the fourth sensor assembly 110 can be referred to as the fourth sensor 177.

The control module 120 connects to the automobile's electrical system to detect the activation of the left and right turn signals 140, 145, and an interface electrically connects the control module 120 to the automobile's left and right audio speakers 132, 137. By patching into the automobile's audio system, additional speakers do not need to be installed; this allows the present invention to be easily and economically incorporated into both new and existing vehicles. The mode switch 150 and left and right alarm lights 130, 135 are installed inside the automobile, and each is connected to the control module 120.

To operate effectively, the collision detection and warning system 100 must sense the presence of an object in the driver's blindspot or other danger zone, make a judgment on the likelihood that this object presents a danger to the driver, and warn the driver to take evasive action. There are many types of sensors that can accomplish this goal. Most use the wave properties of sound, light, or other EM radiation (radar, infrared, etc.) to sense objects. For example, in proximity sensors, a "ping" of sound or EM radiation is sent out. These waves spread out from their source, losing intensity as they spread. If the waves strike an object, they are reflected back towards the source. A sensor can then receive the signal and indicate to the user that an obstacle is present. While the sensors 160 are preferably simple proximity sensors due to their inexpensive nature, other sensors would also be suitable, such as radar, infrared, laser, and ultrasonic sensors.

Because waves spread out in all directions, it is difficult to tell from which direction the signal is reflected. By using multiple transmitters and sensors in a split beam arrangement, more information about the obstacle's position can be determined. For example, if only a left sensor detects an object, the system can conclude that it is somewhere to the left of the overlap region. Beam splitting is used by the present invention to get maximum resolution with the minimum sensor array complexity.

Knowing an object is present is sometimes not enough. It may be important to the current invention to be able to tell the difference between stationary and moving objects, which are likely to be other vehicles. There are many ways to compute speed, two of which are numerical differentiation and Doppler shift measurement. These techniques can be employed with many types of media, including sound and EM radiation and can easily be incorporated into the current invention if so desired.

Figure 1:
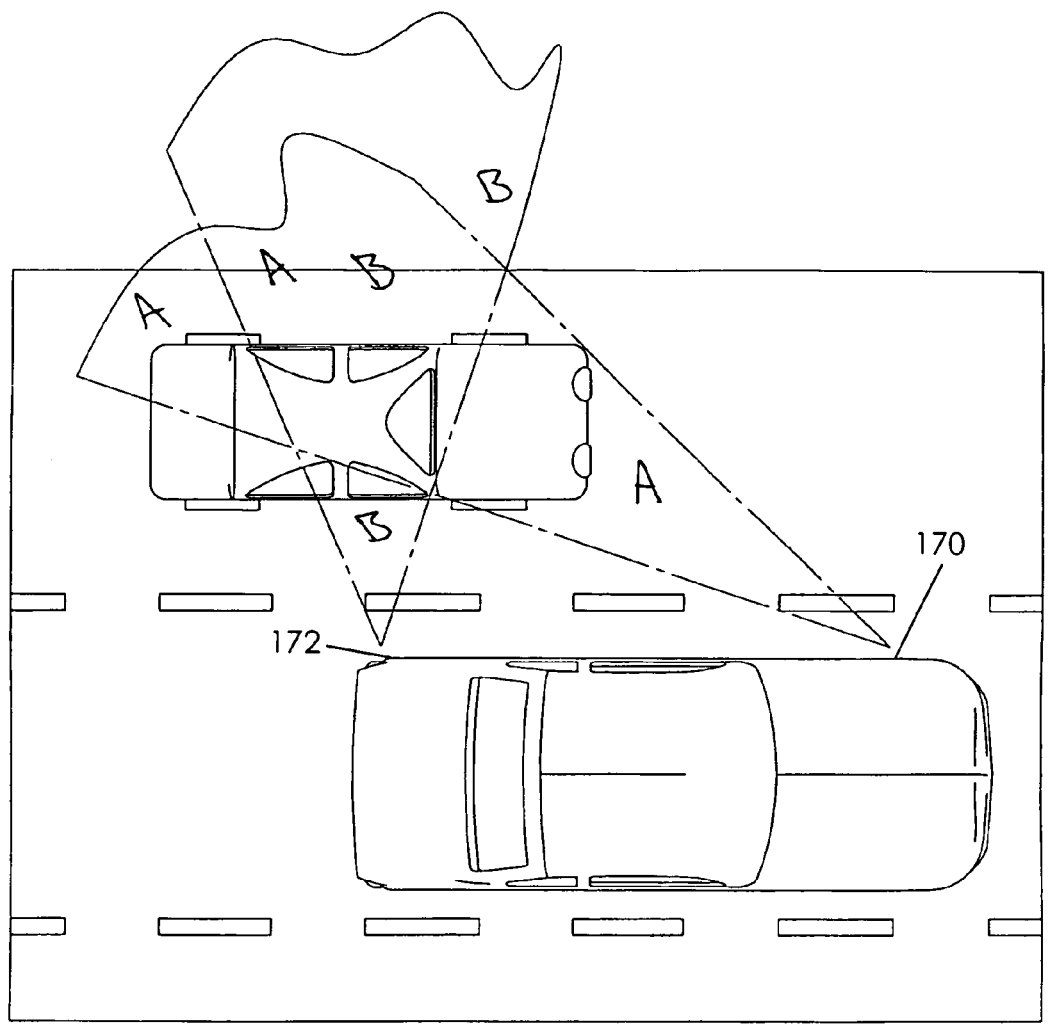
FIG. 1 is a top view of an automobile equipped with a collision detection and warning system according to one embodiment of the present invention.

In the preferred embodiment, the collision detection and warning system 100 focuses on the driver's blindspots to the side and rear of the vehicle, though other danger zones can of course be targeted. The first sensor assembly 110 is installed on the left side of the front bumper 2, the second sensor assembly 110 is installed on the left side of the rear bumper, the third sensor assembly 110 is installed on the right side of the front bumper 2, and the fourth sensor assembly 110 is installed on the right side of the rear bumper. The sensors 170, 175 in the front sensor assemblies 110 point generally rearward, and the sensors 172, 177 in the rear sensor assemblies 110 point generally sideways. The target areas A, B of the first and second sensors 170, 172 are shown in FIG. 1, along with an automobile in the driver's blindspot. To eliminate false alarms, it is important to only activate an alarm to the driver when the target areas A, B of the first and second sensors 170, 172 overlap and the driver is preparing to turn left or the target areas of the third and fourth sensors 175, 177 overlap and the driver is preparing to turn right. To determine if the driver plans to turn left or right, the control module 120 checks for the activation of the left and right turn signals 140, 145.

In use, each of the four sensors 160 transmits "pings" of sound or EM radiation and receives waves that are reflected back. When one of the four sensors 160 receives a reflected signal, a signal is sent to the control module 120 through a respective signal wire 165. The control module 120 alternates between a left blindspot checking routine 121 and a right blindspot checking routine 122. The processing steps of the left blindspot checking routine 121 are shown in the flowchart of FIG. 4, and the processing steps of the right blindspot checking routine 122 are shown in the flowchart of FIG. 5.

In process step S1 of the left blindspot checking routine 121, the control module 120 determines whether the first sensor 170 detects an obstacle. If so, the control module 120 proceeds to step S2; if not, the control module 120 proceeds to step S3, where the control module 120 alternates to the right blindspot checking routine 122.

The control module 120 determines in step S2 whether the second sensor 172 detects an obstacle. If so, the control module 120 proceeds to step S4; if not, the control module 120 proceeds to step S3, where the control module 120 alternates to the right blindspot checking routine 122. If the second sensor 172 detects an obstacle in process step S2, an object is in the left blindspot.

The control module 120 determines in step S4 whether the left turn signal 140 is activated. If so, the control module 120 determines that the driver is moving left and there is an object in the left blindspot; the control module 120 proceeds to step S5. If not, the control module 120 proceeds to step S3, where the control module 120 alternates to the right blindspot checking routine 122.

In process step S5, the control module 120 sends an alarm tone to the left car audio speaker 132 and/or activates the left alarm light 130, depending on whether the mode switch 150 is set to audio warning, visual warning, or audio and visual warning. The control module 120 then proceeds to step S3, where the control module 120 alternates to the right blindspot checking routine 122.

In process step S11 of the right blindspot checking routine 122, the control module 120 determines whether the third sensor 175 detects an obstacle. If so, the control module 120 proceeds to step S12; if not, the control module 120 proceeds to step S13, where the control module 120 alternates to the left blindspot checking routine 121.

The control module 120 determines in step S12 whether the fourth sensor 177 detects an obstacle. If so, the control module 120 proceeds to step S14; if not, the control module 120 proceeds to step S13, where the control module 120 alternates to the left blindspot checking routine 121. If the fourth sensor 177 detects an obstacle in process step S12, an object is in the right blindspot.

The control module 120 determines in step S14 whether the right turn signal 145 is activated. If so, the control module 120 determines that the driver is moving right and there is an object in the right blindspot; the control module 120 proceeds to step S15. If not, the control module 120 proceeds to step S13, where the control module 120 alternates to the left blindspot checking routine 121.

In process step S15, the control module 120 sends an alarm tone to the right car audio speaker 137 and/or activates the right alarm light 135, depending on whether the mode switch 150 is set to audio warning, visual warning, or audio and visual warning. The control module 120 then proceeds to step S13, where the control module 120 alternates to the left blindspot checking routine 121. It is understood, of course, that the mode switch 150 may be set to deactivate the system such as in heavy or congested traffic.

It is also possible for the mode switch 150 to have an override option that would instruct the control module 120 to alert the driver of all obstacles detected by the first sensor 170, regardless of whether the object is detected by the second sensor 172, and all obstacles detected by the third sensor 175, regardless of whether the object is detected by the fourth sensor 177. This would give the driver notice of objects that do not immediately pose a threat, and in effect create more false alarms. However, some users may prefer this. This option is not shown in FIG. 4 or FIG. 5.

Clearly the driver must be given the fastest possible warning without diverting his or her attention from the road, and instead of drawing the driver's attention to the warning signal, the device should ideally draw attention to the danger. Of course, in a lane changing situation, the driver will know the direction from which the danger is likely to originate, but by broadcasting a tone from that direction, the instinctive desire to turn towards a loud noise and assess the situation is utilized. It may even be advisable to mimic the sound of a car horn, as this sound often elicits a quick response when changing lanes. By allowing the driver to choose through the mode switch 150 whether audio alerts, visual alerts, or both will be provided, the present invention accounts for personal preferences. The mode switch 150 may also be used to disable (turn off) and enable (turn on) the collision detection and warning system 100. Conversely, it is possible to eliminate the mode switch 150 and the left and right alarm lights 130, 135 from the present invention and rely on audio alerts. This would make the collision detection and warning system 100 easier to retrofit onto existing vehicles.

Figure 7:
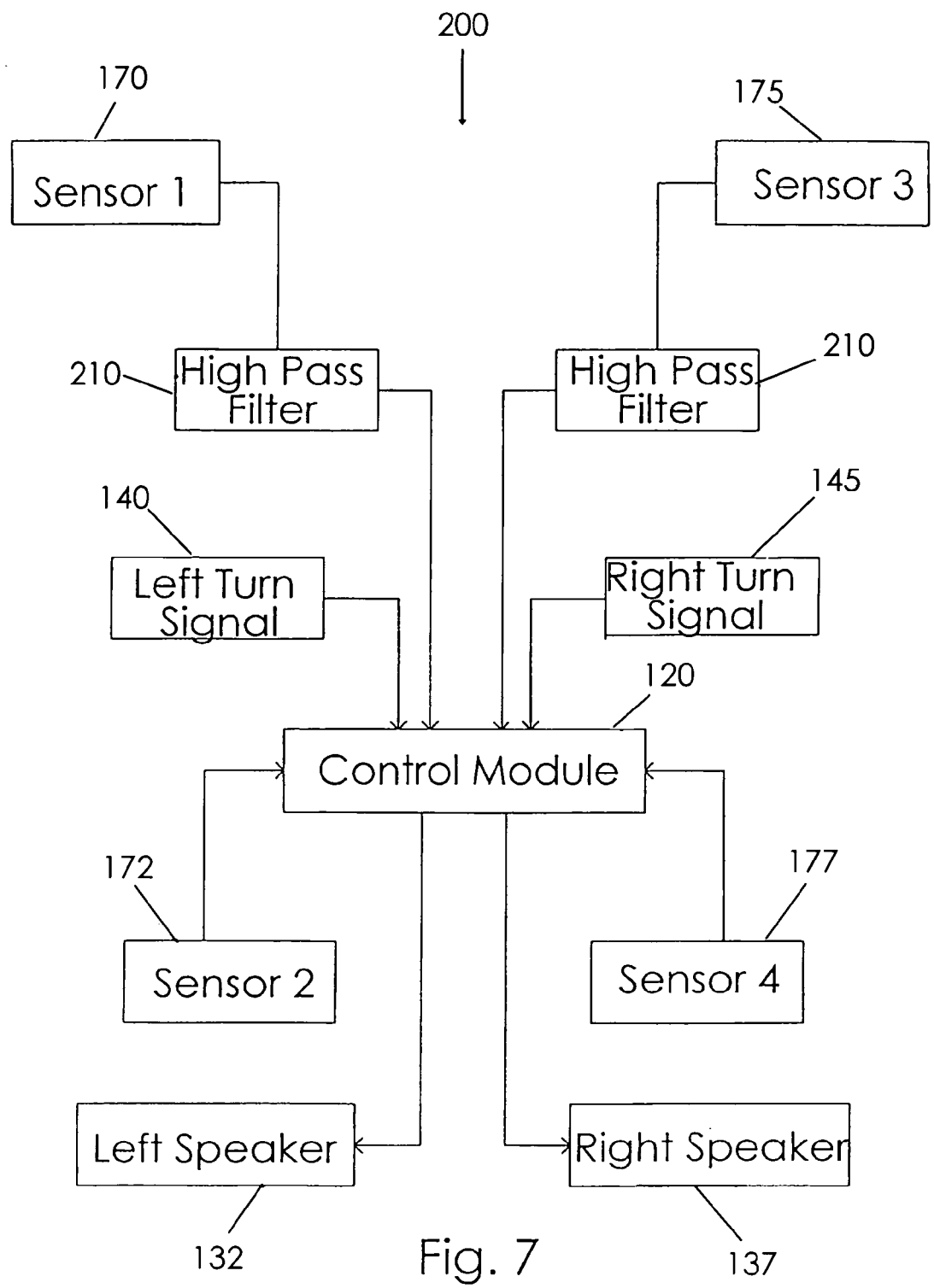
FIG. 7 is a block diagram showing the components of a collision detection and warning system according to another embodiment of the present invention.

A collision detection and warning system 200 according to another embodiment of the present invention is shown in FIG. 7 and includes a construction substantially similar to the construction previously described except as specifically noted below. More particularly, the collision detection and warning system 200 according to this embodiment includes two high pass filters 210 to create a simple and cost-effective version of Doppler radar and further eliminate false alarms. The logic of warning system 200 is substantially similar to the logic of the warning system 100 described previously and as represented in FIGS. 4 and 5. However, it should be understood that the signals from the first and third sensors 170, 175 have passed through the high pass filters 210. The collision detection and warning system 200 as shown in FIG. 7 does not include a mode switch 150 or a left or right alarm light 130, 135. Nevertheless, these features are shown in FIGS. 4 and 5 and can easily be included with the collision detection and warning system 200 if desired.

If another car is moving at roughly the same speed as the vehicle equipped with either the collision detection and warning system 100 or the collision detection and warning system 200, the respective system will receive echoes at approximately the same frequency as the original transmission. In contrast, reflections from stationary objects are stretched out to a lower frequency because the object is moving relative to the car. A high pass filter 210 is used with the first and third sensors 170, 175 in the collision detection and warning system 200 to eliminate low frequency reflections and help minimize false positives from stationary objects, such as road signs or barricades, which may otherwise result. A high pass filter 210 may also be used in connection with all of the sensors 160.

It is understood that while certain forms of this invention have been illustrated and described, it is not limited thereto except insofar as such limitations are included in the following claims and allowable functional equivalents thereof.

The invention claimed is:

1. A collision detection and warning system for an automobile having a multi-speaker audio system, comprising:
    a plurality of sensors mounted to an exterior surface of an automobile for cooperatively detecting the presence of an obstacle in a plurality of danger zones;
    a control unit for processing signals received from said sensors;
    an interface electrically connected to said control unit and to the automobile audio system for providing an audible warning to a driver that an obstacle has been detected in one of said danger zones by one or more of said sensors;

means in said control unit for varying said audible warning so as to indicate to the driver in which danger zone the obstacle is located;

a plurality of sensor mounting assemblies, each sensor mounting assembly including an outer mounting plate for removable attachment to the exterior surface of the automobile and defining an opening for adjustably receiving one of said sensors; and wherein each said sensor mounting assembly further includes an inner mounting plate for removable attachment to the interior surface of the automobile, said inner mounting elate having a ball and socket configuration for adjustably receiving one of said sensors.

2. The collision detection and warning system as in claim 1 wherein said interface is electrically connected to a first speaker of said automobile audio system located on the left side of an interior of said automobile arid a second speaker of said automobile audio system located on the right side of the interior of said automobile.

3. The collision detection and warning system as in claim 2 wherein a said means for varying said audible warning causes an audible warning tone to sound in said first speaker to indicate the obstacle is located in a danger zone on a left side of the automobile and causes said warning to sound in said second speaker to indicate the obstacle is located in a danger zone on a right side of the automobile.

4. The collision detection and warning system as in claim 1 wherein each said sensor mounting assembly further includes:

a circuit board; and means for electrically connecting said circuit board to one of said sensors, the automobile's electrical system, and said control unit.

5. The collision detection and warning system as in claim 1 further comprising:

a visual warning indicator for providing a visual warning to a driver that an obstacle has been detected in one of said danger zones by one or more of said sensors; and means in said control unit for varying said visual warning so as to indicate to the driver in which danger zone the obstacle is located.

6. The collision detection and warning system as in claim 5 wherein:

said visual warning indicator includes a first alarm light and a second alarm light mounted inside the automobile; and said means for varying said visual warning causes said first alarm light to activate to indicate the obstacle is located in a danger zone on a left side of the automobile and causes said second alarm light to activate to indicate the obstacle is located in a danger zone on a right side of the automobile.

7. The collision detection and warning system as in claim 5 wherein said control unit is electrically connected to left and right turn signal controls of the automobile and includes means for suppressing said audible warnings and said visual warnings unless a respective turn signal control is actuated.

8. The collision detection and warning system as in claim 7 further comprising at least one high pass filter electrically connected to at least one of said sensors and to said control unit for filtering signals received from said at least one of said sensors before said signals reach said control unit.

9. The collision detection and warning system as in claim 7 further comprising:

a mode switch electrically connected to the control unit for driver selection of audible warnings, visual warnings, or both; and means in said control unit fur selectively enabling said audible and visual warnings in accordance with said driver selection.

10. The collision detection and warning system as in claim 9 wherein said mode switch includes means to selectively disable and enable said collision detection and warning system.

11. The collision detection and warning system as in claim 1 further comprising at least one high pass filter electrically connected to at least one of said sensors and to said control unit for filtering signals received from said at least one of said sensors before said signals reach said control unit.

12. A collision detection and warning system for an automobile having a multi-speaker audio system, comprising:

a plurality of sensors mounted to an exterior surface of an automobile for cooperatively detecting the presence of an obstacle in a plurality of danger zones;

a control unit for processing signals received from said sensors;

an interface electrically connected to said control unit and to the automobile audio system for providing an audible warning to a driver that an obstacle has been detected in one of said danger zones by one or more of said sensors;

means in said control unit for varying said audible warning so as to indicate to the driver in which danger zone the obstacle is located;

wherein said control unit is electrically connected to left and right turn signal controls of the automobile and includes means for suppressing said audible warning unless a respective turn signal control is actuated;

a plurality of sensor mounting assemblies, each sensor mounting assembly including an outer mounting plate for removable attachment to the exterior surface of the automobile and defining an opening for adjustably receiving one of said sensors; and wherein each said sensor mounting assembly further includes an inner plate for removable attachment to the interior surface of the automobile, and said inner plate having a ball and socket configuration for adjustably receiving one of said sensors.

13. The collision detection and warning system as in claim 12 wherein each said sensor mounting assembly further includes:

a circuit board; and means for electrically connecting said circuit board to one of said sensors, the automobile's electrical system, and said control unit.

14. The collision detection and warning system as in claim 12 further comprising:

a visual warning indicator for providing a visual warning to a driver that an obstacle has been detected in one of said danger zones by one or more of said sensors; and means in said control unit for varying said visual warning so as to indicate to the driver in which danger zone the obstacle is located.

15. The collision detection and warning system as in claim 12 further comprising at least one high pass filter electrically connected to at least one of said sensors and to said control unit for filtering signals received from said at least one of said sensors before said signals reach said control unit, whereby to eliminate low frequency signal reflections indicative of stationary objects.

16. The collision detection and warning system as in claim 12 wherein said plurality of sensors are proximity sensors.

* * * * *